United States Patent
Watanabe et al.

(10) Patent No.: US 7,652,819 B2
(45) Date of Patent: Jan. 26, 2010

(54) PROJECTION-TYPE IMAGE DISPLAY APPARATUS

(75) Inventors: Norihiro Watanabe, Tokyo (JP);
Daisuke Echizenya, Tokyo (JP);
Atsushi Michimori, Tokyo (JP);
Tomohiro Sasagawa, Tokyo (JP);
Hiroaki Sugiura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/076,817

(22) Filed: Mar. 24, 2008

(65) Prior Publication Data

US 2008/0252968 A1 Oct. 16, 2008

(30) Foreign Application Priority Data

Apr. 12, 2007 (JP) ............................. 2007-104998

(51) Int. Cl.
*G03B 21/56* (2006.01)
(52) U.S. Cl. ...................................... 359/446
(58) Field of Classification Search ................. 359/443, 359/446
See application file for complete search history.

(56) References Cited

U.S. PATENT DOCUMENTS

| 4,143,943 A * | 3/1979 | Rawson ...................... 359/446 |
| 2007/0171521 A1 * | 7/2007 | Sugawara et al. ........... 359/443 |
| 2007/0247707 A1 * | 10/2007 | Michimori et al. .......... 359/446 |

FOREIGN PATENT DOCUMENTS

| JP | 49-5256 | 1/1974 |
| JP | 55-65940 A | 5/1980 |
| JP | 55-146439 | 11/1980 |
| JP | 01-319026 | 12/1989 |
| JP | 2006-343663 | 12/2006 |
| JP | 2007-199292 A | 8/2007 |

* cited by examiner

*Primary Examiner*—Christopher Mahoney
(74) *Attorney, Agent, or Firm*—Birch, Stewart, Kolasch & Birch, LLP

(57) ABSTRACT

A Fresnel lens collimates a light modulated by an image signal and outputs a collimated light. A diffusion member diffuses the collimated light and outputs a diffused light. A driver continually moves the Fresnel lens or the diffusion member on a predetermined trajectory within a plane parallel with a screen. A spring member couples the Fresnel lens or the diffusion member with a casing, including a first deformation plane flexible in a first direction within the plane, and a second deformation plane flexible in a second direction substantially perpendicular to the first direction within the plane, while it is not flexible in a direction perpendicular to the plane.

19 Claims, 13 Drawing Sheets

PROJECTION-TYPE IMAGE DISPLAY APPARATUS

BACKGROUND OF THE INVENTION

1. Field of the Invention

The present invention relates to a projection-type image display apparatus, and more particularly, to a vibration technology for a screen of the projection-type image display apparatus.

2. Description of the Related Art

A laser can be used as a light source to achieve superior picture quality or superior brightness for an image displayed on a screen of a projection-type image display apparatus such as a projection television of a rear projection-type. However, in the case of using the laser, a glare appears on the screen due to a speckled pattern, which is so called scintillation, is more obvious than in the case of a conventional projection television that uses a lamp as the light source.

As a method of reducing the scintillation, the screen is vibrated in one of a direction perpendicular to an image display surface of the screen (a direction perpendicular to a surface of the screen), a longitudinal direction of the screen, and a lateral direction of the screen. Such a method is disclosed, for example, in Japanese Patent Application Laid-open No. S55-65940.

However, when the screen is vibrated in the direction perpendicular to the surface of the screen as in the above conventional technology, the resolution is degraded.

Furthermore, because the screen moves intermittently when the screen is moved in the longitudinal direction or the lateral direction, severe scintillation occurs when the screen is at standstill. Therefore, it is not possible to reduce the scintillation sufficiently in the conventional technology.

In other words, when the screen is intermittently moved, the severe scintillation (glare) occurs when the screen is at standstill while the scintillation is no longer visible when the screen is moving. As a result, the scintillation repeatedly changes in intensity with time.

SUMMARY OF THE INVENTION

It is an object of the present invention to at least partially solve the problems in the conventional technology.

According to an aspect of the present invention, there is provided a projection-type image display apparatus that includes an optical engine that modulates a laser light according to an image signal and outputs a modulated light; a screen including a Fresnel lens that collimates the modulated light from the optical engine and outputs a collimated light, and a diffusion member that diffuses the collimated light from the Fresnel lens and outputs a diffused light; a driver that continually moves either one of the Fresnel lens and the diffusion member on a predetermined trajectory within a plane parallel with the screen; a casing that supports the optical engine, the Fresnel lens, the diffusion member, and the driver; and a spring member that couples either one of the Fresnel lens and the diffusion member with the casing. The spring member includes a first deformation plane flexible in a first direction within the plane, and a second deformation plane flexible in a second direction substantially perpendicular to the first direction within the plane. The spring member is not flexible in a direction perpendicular to the plane.

Furthermore, according to another aspect of the present invention, there is provided a projection-type image display apparatus that includes an optical engine that modulates a laser light according to an image signal and outputs a modulated light; a screen including a Fresnel lens that collimates the modulated light from the optical engine and outputs a collimated light, and a diffusion member that diffuses the collimated light from the Fresnel lens and outputs a diffused light; a driver that moves either one of the Fresnel lens and the diffusion member on a predetermined trajectory within a plane parallel with the screen; a casing that supports the optical engine, the Fresnel lens, the diffusion member and the driver; and a spring member that couples either one of the Fresnel lens and the diffusion member with the casing. The spring member is formed with a plate member having a first end and a second end across a bent portion. The first end of the plate member is fixed to the casing and the second end of the plate member is fixed to the screen.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a projection-type image display apparatus according to the present invention will be explained in detail below with reference to the accompanying drawings. However, the present invention is not to be considered limited to the embodiments.

Figure 1:
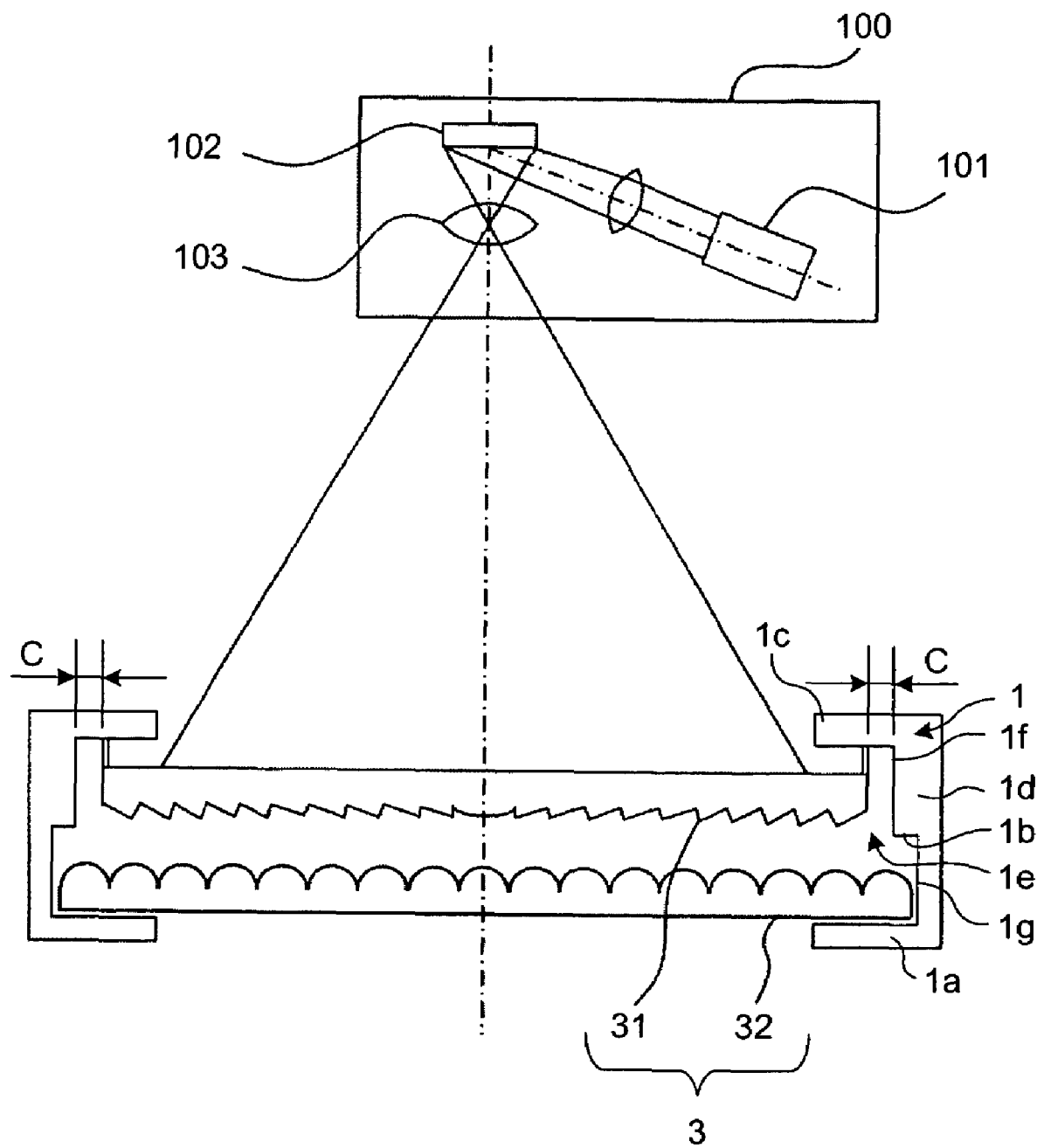
FIG. 1 is a schematic diagram of an optical system of a projection-type image display apparatus according to the present invention.

FIG. 1 is a schematic diagram of an optical system of a projection-type image display apparatus according to the present invention. A structure of an image projection apparatus of a rear projection type is shown in FIG. 1. An optical engine 100 modulates a laser light according to an image signal and projects an image onto a screen 3 from the rear side. The optical engine 100 includes a laser module 101 that is a laser light source, a digital micromirror device (DMD) 102 that is a spatial light modulating element that spatially modulates a laser light from the laser module 101 according to an input signal so as to form an image, and an optical projection system 103 for enlarging the image formed by the DMD 102 and projecting the image onto the screen 3.

The screen 3 includes a Fresnel lens 31 and a lenticular screen 32 superposed with each other. The screen 3 is supported by a casing 1. The casing 1 supports the optical engine 100, the screen 3, and a Fresnel lens drive mechanism. In this case, because the screen 3 is a transmission type, the Fresnel lens 31 is arranged on the optical projection system 103 side, and the lenticular screen 32 is on an observer side. The Fresnel lens 31 collimates the light projected from the optical projection system 103. The lenticular screen 32 has a layered structure including a lenticular sheet formed with a cylindrical lens array, a scattering layer, and a black stripe. The lenticular screen 32 then acts as a diffusion member that outputs a projection light, which is collimated by the Fresnel lens 31, to the observer side as an image light in a wide angle.

Figure 2:
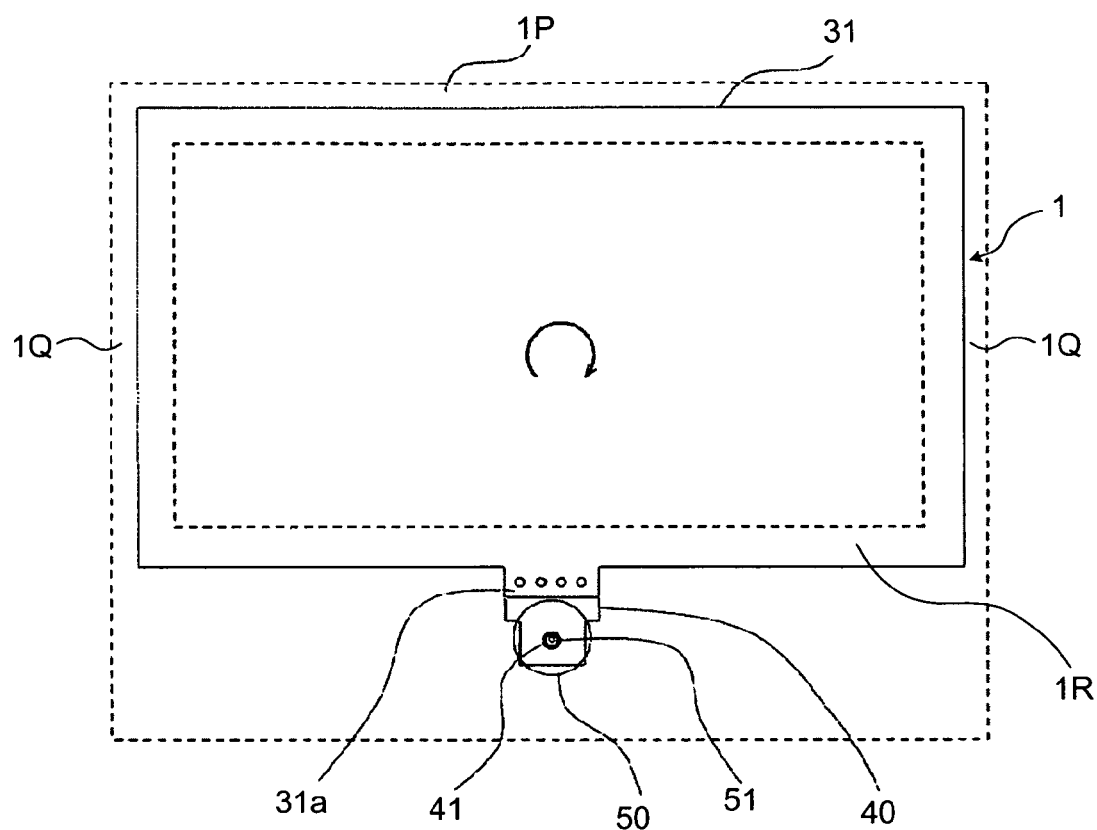
FIG. 2 is a front view of a screen of the projection-type image display apparatus according to the present invention.

As indicated by a broken line shown in FIG. 2, the front side of the casing 1 has a rectangular opening for supporting the Fresnel lens 31 and the lenticular screen 32. A frame member is then formed at the periphery of the opening. FIG. 1 depicts only a frame member that supports the Fresnel lens 31 and the lenticular screen 32 of the casing 1. The frame member has a recessed cross-section as shown in FIG. 1. Although only a cross-section of a lateral frame is shown in FIG. 1, an upper frame 1P, lateral frames 1Q, and a lower frame 1R making up the frame member support the Fresnel lens 31 and the lenticular screen 32, as shown in FIG. 2. A recess 1e is formed by a front plate 1a, a rear plate 1c, and side plates 1d. The recess 1e is formed with a shallow first recess 1f positioned at the optical projection system 103 side and a second recess 1g positioned on the observer side, which is deeper than the first recess 1f, forming a stepped portion 1b at the side plates 1d.

The lenticular screen 32 is arranged at the second recess 1g and is supported between the stepped portion 1b and the front plate 1a. The Fresnel lens 31 is supported at the rear plate 1c of the frame member with a predetermined clearance C with the casing 1 so as to enable movement in an in-plane direction of the screen.

Figure 3:
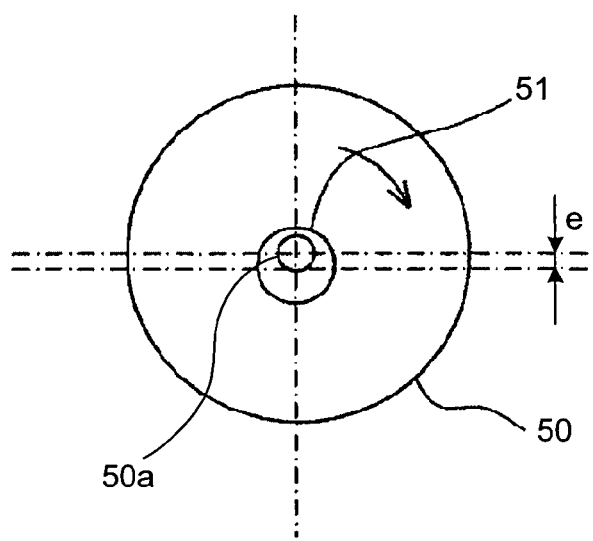
FIG. 3 is a schematic diagram of a motor and a cam of the projection-type image display apparatus according to the present invention.

FIG. 2 is a front view of the projection-type image display apparatus according to the present invention. A convex portion 31a is formed at the central of the lower end of the Fresnel lens 31. A transmission member 40 is provided at the convex portion 31a extending downwards. A hole 41 into which a cam 51 is inserted is formed at the transmission member 40. The cam 51 is provided in an eccentric manner at a rotating shaft 50a of a motor 50 that is a drive unit, as shown in FIG. 3. The cam 51 is inserted into the hole 41 formed in the transmission member 40.

The cam 51 arranged eccentrically at the rotating shaft 50a of the motor 50 rotates when the motor 50 rotates. The cam 51 is circular and the rotating shaft 50a of the motor 50 is fixed at a position offset by a predetermined distance e from a center axis 51a of the cam 51. The cam 51 then moves in an eccentric circle as indicated by the arrow shown in FIG. 3 by the rotation of the motor 50. The Fresnel lens 31 then moves periodically on a trajectory of an eccentric circle within a plane parallel to the surface of the screen via the transmission member 40 acting according to rotation of the cam 51 (the arrow shown in FIG. 2). This means that the Fresnel lens 31 is moving constantly in any direction without stopping at any instant and a state where the scintillation is reduced is therefore maintained.

However, with the projection-type image display apparatus of this configuration, the light projected from the optical engine 100 is incident obliquely across substantially the whole area within the screen at the Fresnel lens 31. This means that the position of incidence of light from the optical engine 100 to the Fresnel lens 31 changes when there is even a slight movement of the Fresnel lens 31 in a direction perpendicular to the surface of the screen during in-plane movement of the Fresnel lens 31 within the screen and a distortion therefore occurs in the image displayed on the screen.

It has therefore been considered to fix the Fresnel lens 31 and move only the lenticular screen 32. However, the lenticular screen 32 is positioned nearest to the observer side. Movement of the lenticular screen 32 can therefore be inhibited by a contact of an observer or other external causes. It is therefore desirable for the Fresnel lens 31 to move continuously without making a movement in the direction perpendicular to the surface of the screen removing hindrance to movement, to reduce the scintillation.

Figure 4:
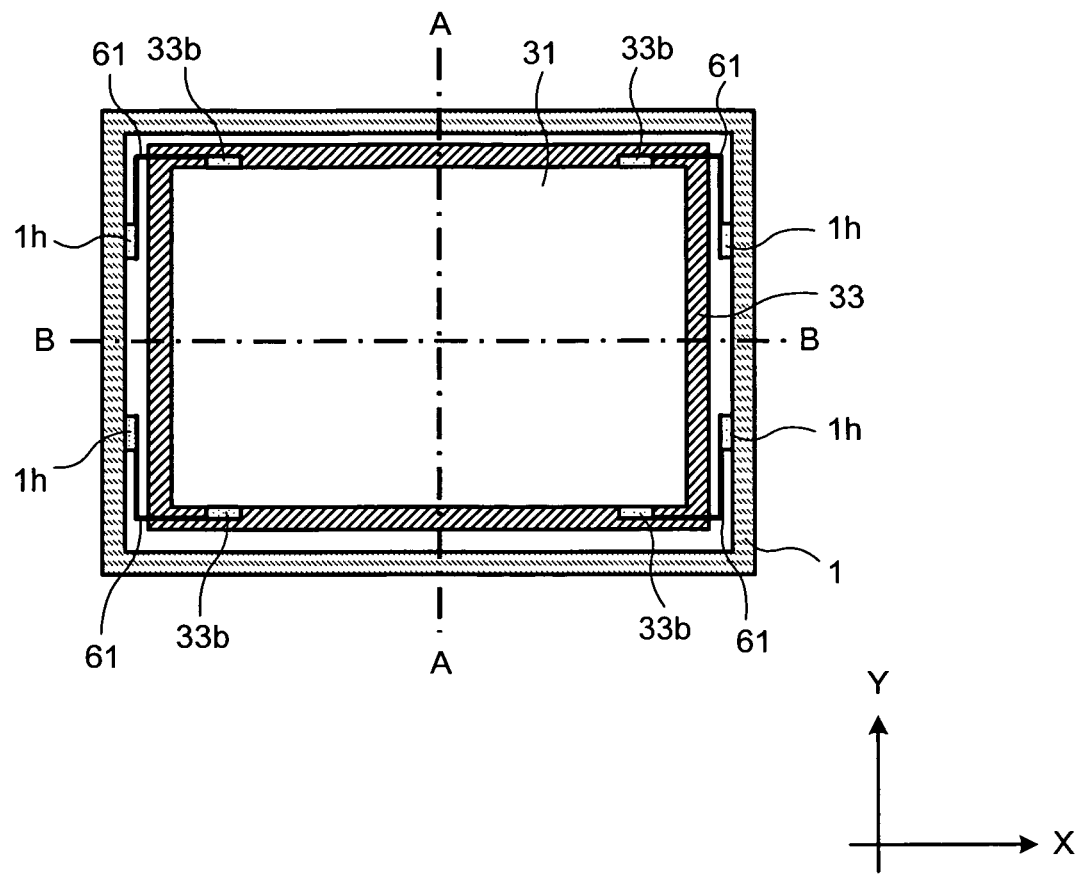
FIG. 4 is a rear view of a Fresnel-lens support mechanism according to a first embodiment of the present invention.
Figure 5:
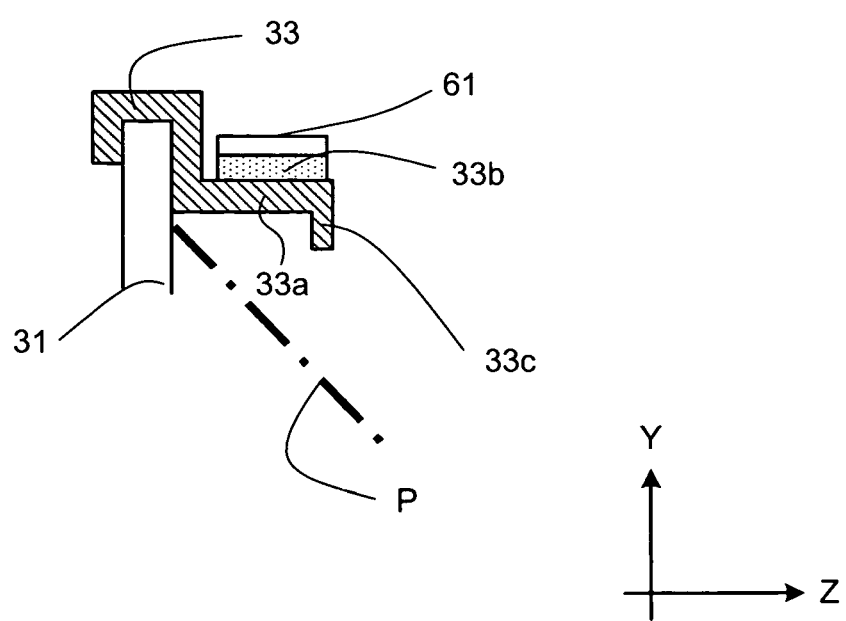
FIG. 5 is a partial cross-section of the Fresnel-lens support mechanism along a line A-A shown in FIG. 4.

A description is now given of a structure for the Fresnel-lens support mechanism according to a first embodiment of the present invention using FIGS. 4 and 5. In the following figures, the X-direction is a long-side direction of the surface of the screen, the Y-direction is a short-side direction of the surface of the screen, and the Z-direction is a direction perpendicular to the surface of the screen. FIG. 4 is a rear view of a support structure for the Fresnel lens 31 according to the first embodiment, and FIG. 5 is a partial cross-section of the support structure along a line A-A shown in FIG. 4. As shown in FIGS. 4 and 5, the Fresnel lens 31 is fitted to a recessed lens frame 33 and is fixed using, for example, adhesive. The lens frame 33 includes a protruding portion 33a formed protruding to the incident light side (optical engine side) from the lens frame 33 and a flange 33c protruding to the inside from the protruding portion 33a. The flange 33c extends in a direction parallel with the screen projection plane and is formed at a position with a length with which an incident light P from the optical engine 100 is not blocked.

Plate-spring fixing members 33b for fixing ends of plate springs 61 are arranged at the protruding portions 33a at the four corners of the lens frame 33. The other ends of the plate springs 61 are fixed to plate-spring fixing members 1h provided at the casing 1 side. Four plate springs 61 are therefore arranged and fixed in an axially symmetrical manner at screen center axes A and B.

Figure 6:
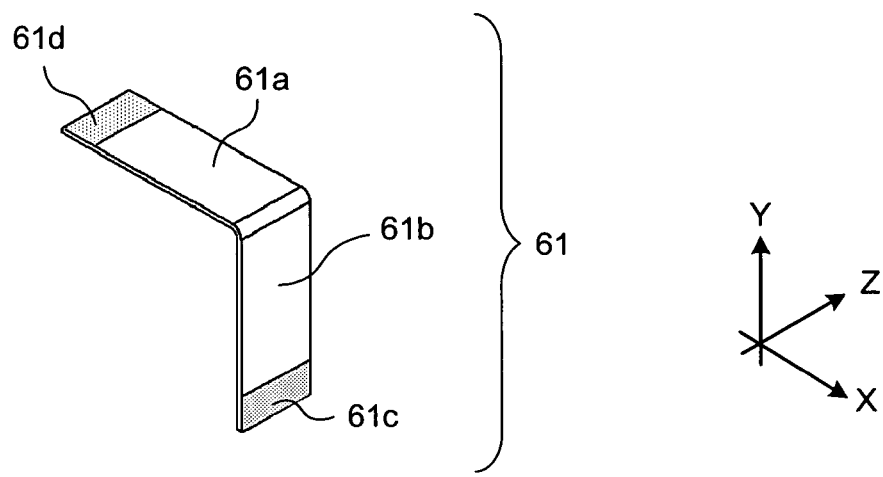
FIG. 6 is a perspective view of a plate spring according to the first embodiment.

FIG. 6 is a perspective view of the plate springs 61. In FIG. 6, the plate spring 61 is formed in an L-shape having first and second deformation planes 61a and 61b elongated in the XY-direction. A fixing member 61c at one end of the plate spring 61 is fixed to the casing 1 and a fixing member 61d at the other end is fixed to the lens frame 33. The first deformation plane 61a is elongated in the X-direction and is flexible in the Y-direction. The second deformation plane 61b is elongated in the Y-direction and is flexible in the X-direction. The plate springs 61 designed with a bending angel of an L-shaped connecting portion formed at an angle of substantially 90 degrees are used as the plate springs 61 that bear the weight of the Fresnel lens 31 and the lens frame 33.

Figure 7:
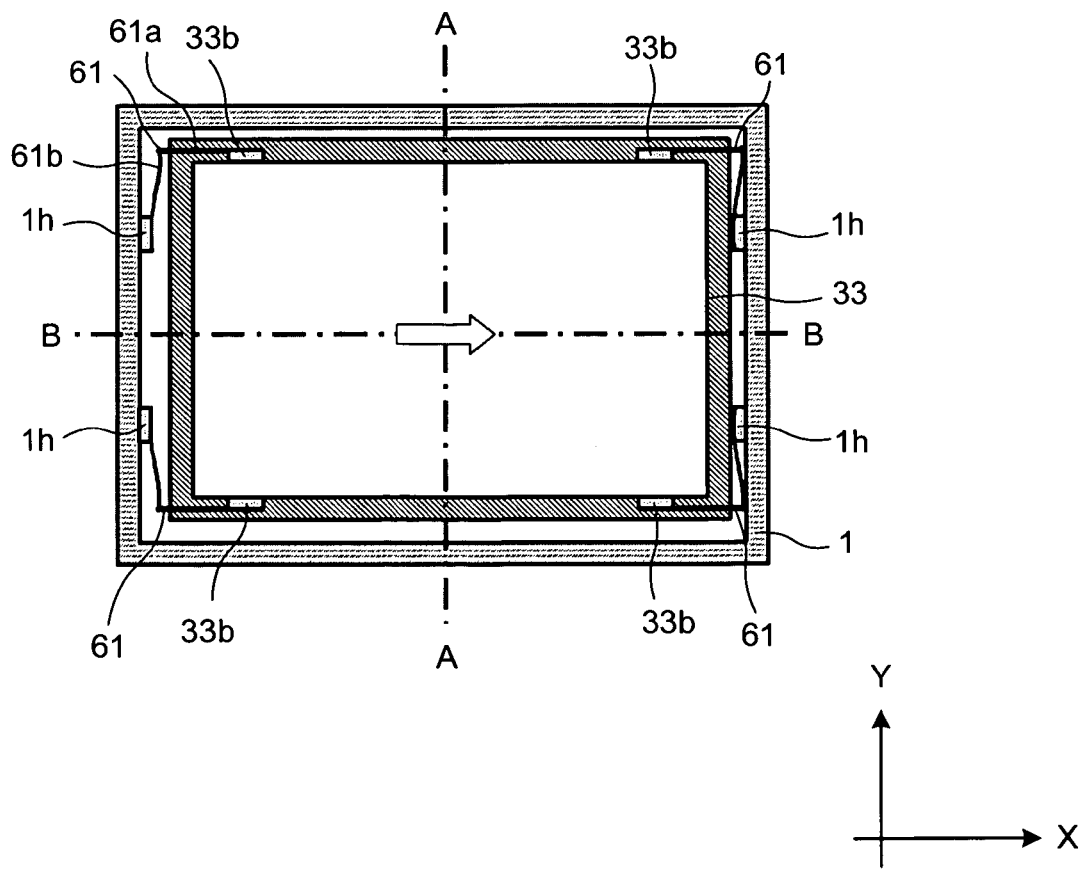
FIG. 7 is a rear view of the Fresnel-lens support mechanism when the Fresnel lens according to the first embodiment moves in a positive X-direction.
Figure 8:
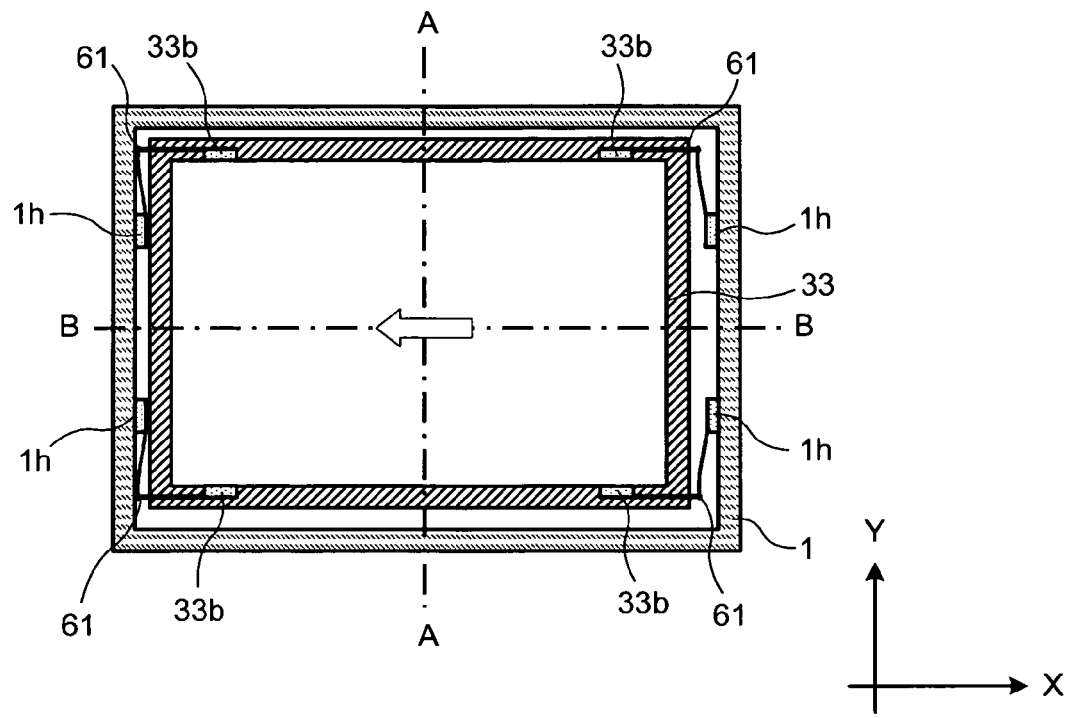
FIG. 8 is a rear view of the Fresnel-lens support mechanism when the Fresnel lens according to the first embodiment moves in a negative X-direction.
Figure 9:
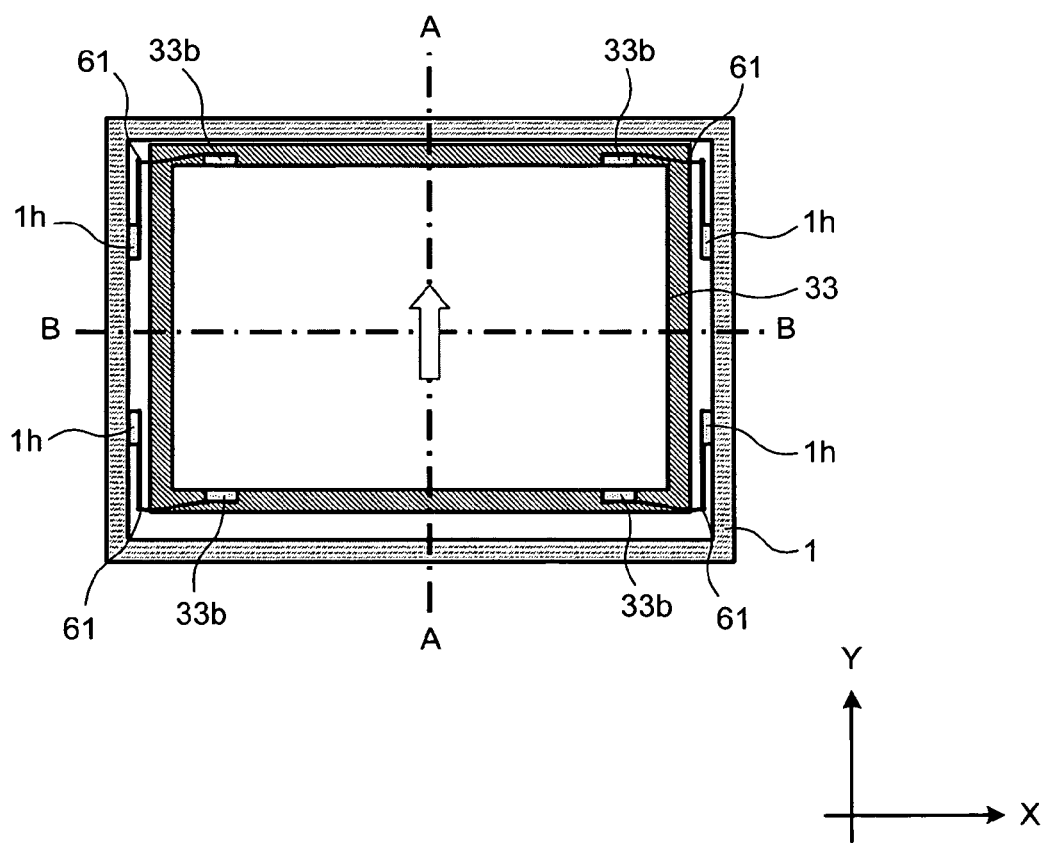
FIG. 9 is a rear view of the Fresnel-lens support mechanism when the Fresnel lens according to the first embodiment moves in a positive Y-direction.
Figure 10:
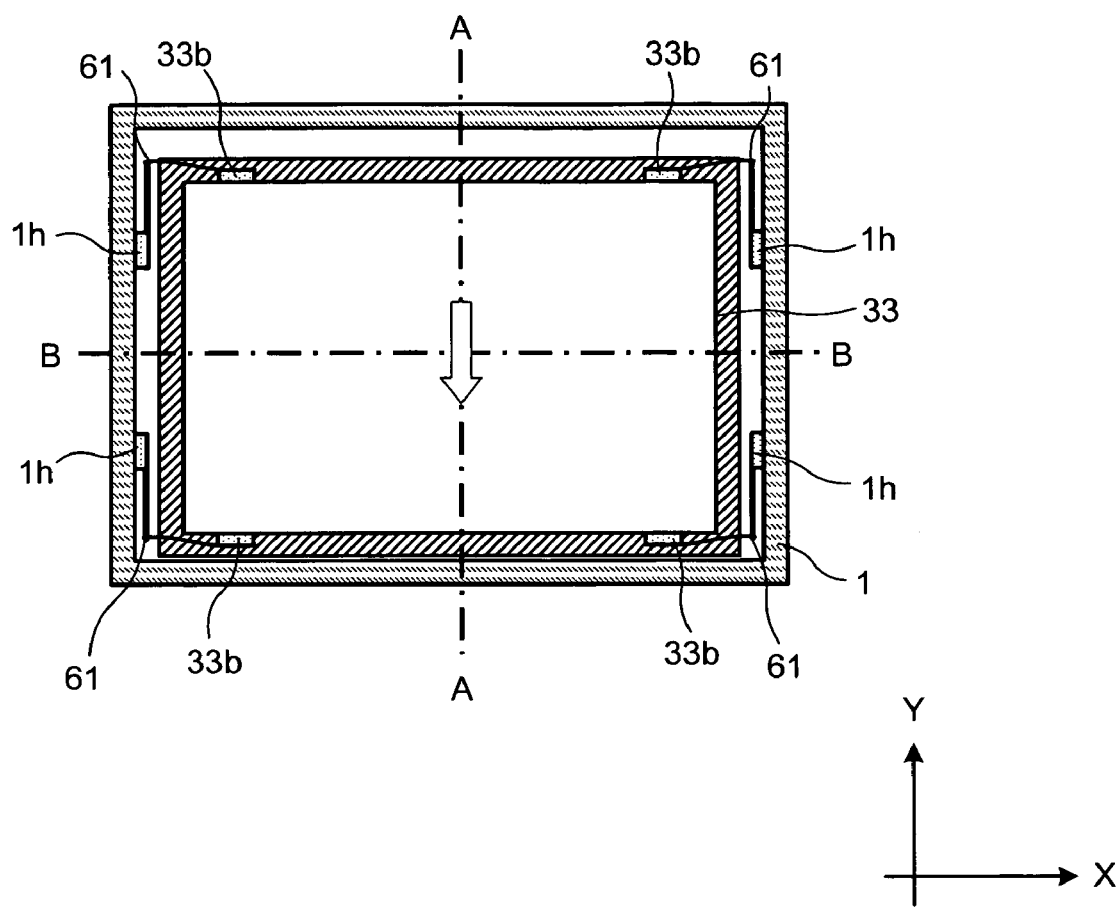
FIG. 10 is a rear view of the Fresnel-lens support mechanism when the Fresnel lens according to the first embodiment moves in a negative Y-direction.

Next, an operation of moving the Fresnel lens using the Fresnel-lens support mechanism according to the first embodiment is explained according to FIGS. 7 to 10. FIG. 7 depicts a situation where the Fresnel lens 31 is moved in a right direction, FIG. 8 depicts a situation where the Fresnel lens 31 is moved in a left direction, FIG. 9 depicts a situation where the Fresnel lens 31 is moved upwards, and FIG. 10 depicts a situation where the Fresnel lens 31 is moved downwards.

The Fresnel lens 31 is supported by L-shaped plate springs 61 having first and second deformation planes 61a and 61b elongated in the XY-direction during eccentric movement by the Fresnel lens 31 in an in-plane direction as a result of the operation of the cam 51. Movement of an X-direction component causes the second deformation plane 61b elongated in the Y-direction to flex as shown in FIGS. 7 and 8, and movement of a Y-direction component causes the first deformation plane 61a elongated in the X-direction to flex as shown in FIGS. 9 and 10. Movement in an in-plane direction is then possible. The plate springs 61 do not have a deformation plane in the Z-direction and rigidity in the Z-direction is therefore high. The Fresnel lens 31 can therefore move in an in-plane direction of the screen without the Fresnel lens 31 tilting with respect to the casing 1. It is therefore possible to stably reduce scintillation without distortion occurring in images during movement and movement is not hindered by external causes such as touching by an observer.

When a support surface that supports the Fresnel lens 31 is provided at the casing 1 side, in-plane movement of the Fresnel lens 31 is guided as a result of the Fresnel lens 31 sliding along the support surface. Friction therefore occurs with the support surface when the Fresnel lens 31 moves and damage due to friction and changes in the moving load as a result of this friction are therefore assumed. However, in the first embodiment, the Fresnel lens 31 is supported and in-plane movement is guided by the plate springs 61. This means that sliding locations no longer exist and the detrimental effects of friction are no longer present.

It is also necessary to provide clearance for the movement operation at the channel when movement of the Fresnel lens 31 is guided by the channel-shaped guide. In this case, this clearance becomes the inclination of the Fresnel lens 31 without any modification. However, in the first embodiment, it is taken that clearance for movement of the Fresnel lens 31 is not necessary and that inclination does not occur. Moreover, the plate springs 61 are a simple L-shape and a support mechanism can therefore be made cheaply. In the first embodiment, because the plate spring 61 is fitted to the flange 33c of the lens frame 33, which is slightly smaller than the external dimension of the Fresnel lens 31, the first deformation plane 61a of the plate spring 61 therefore does not project out of the external shape of the Fresnel lens 31, so that a gap during movement of the Fresnel lens 31 can be made small. The plate springs 61 are arranged along edges of the four corners of the Fresnel lens 31. It is therefore possible to make the Fresnel-lens support mechanism without making the external shape when viewed in an XY plane large. It is also possible to make the casing 1 thin and to improve the design as a result of both of these results.

In the first embodiment, the four corners of the Fresnel lens 31 are supported by the plate springs 61 where the first and second deformation planes are elongated in the XY-direction. In a second embodiment of the present invention, the first and second deformation planes are supported by plate springs 62 that are elongated in the YZ-direction.

Figure 11:
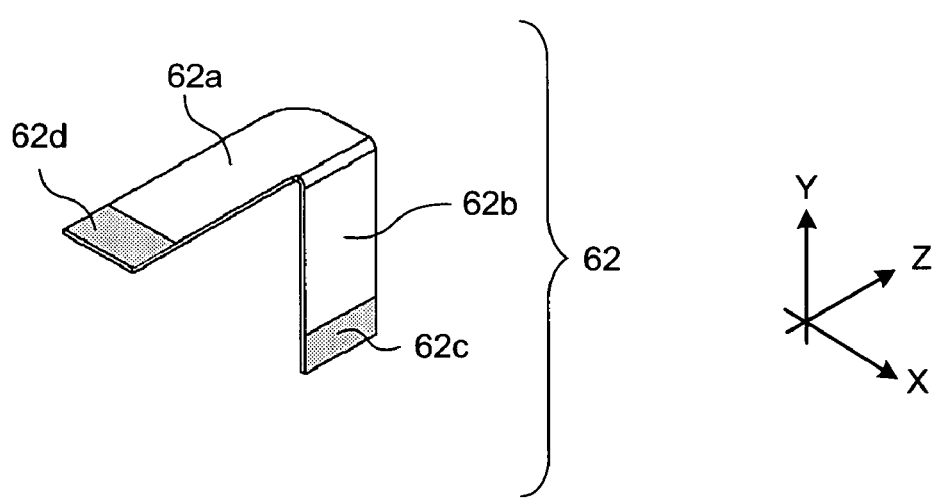
FIG. 11 is a perspective view of a plate spring according to a second embodiment of the present invention.

An explanation is now given of a structure for the plate springs 62 used in the second embodiment using FIG. 11. FIG. 11 is a perspective view of the shape of the plate spring 62. In FIG. 11, the plate spring 62 is formed as an L-shape having first and second deformation planes 62a and 62b elongated in the YZ-direction, with a fixing member 62c on one end fixed to the casing 1 and a fixing member 62d on the other end fixed to the lens frame 33. The first deformation plane 62a is elongated in the Z-direction and is flexible in the Y-direction. The second deformation plane 62b is elongated in the Y-direction and is flexible in the X-direction.

Figure 12:
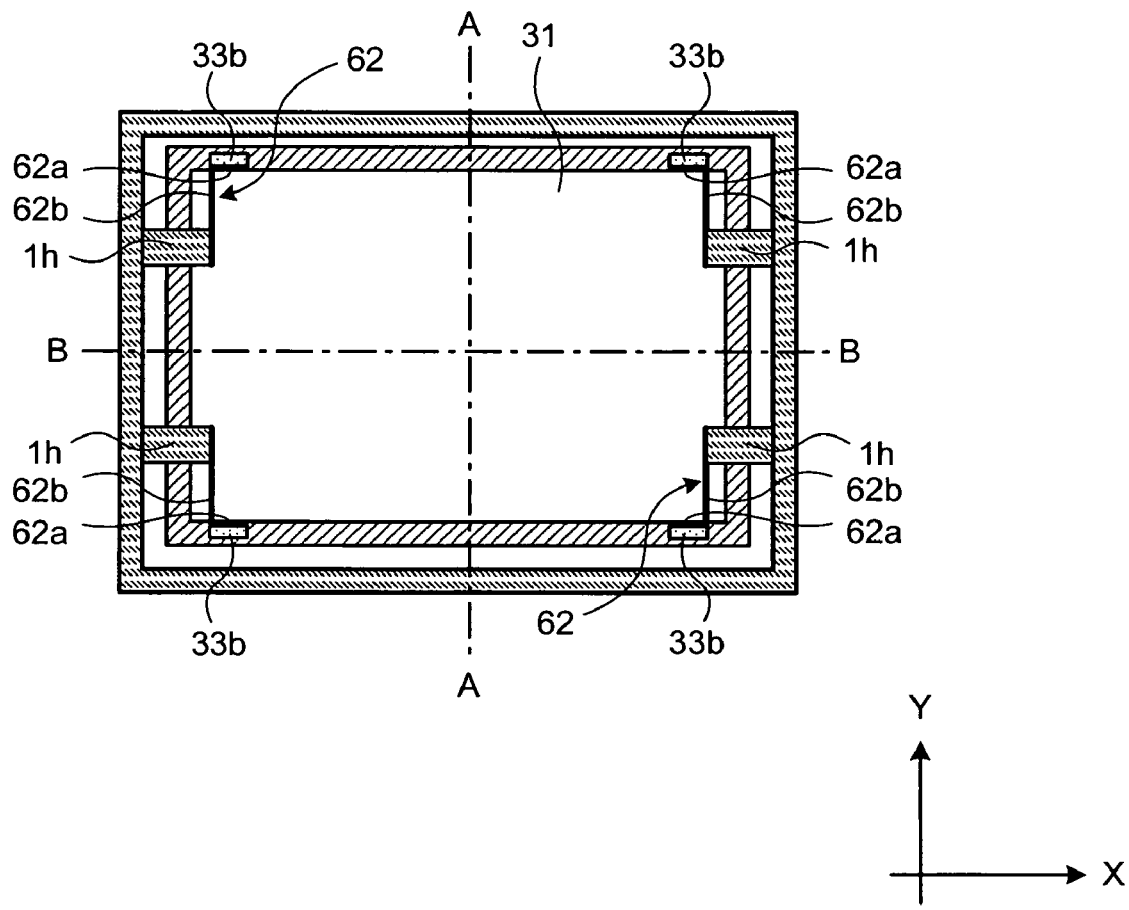
FIG. 12 is a rear view of a Fresnel-lens support mechanism according to the second embodiment.
Figure 13:
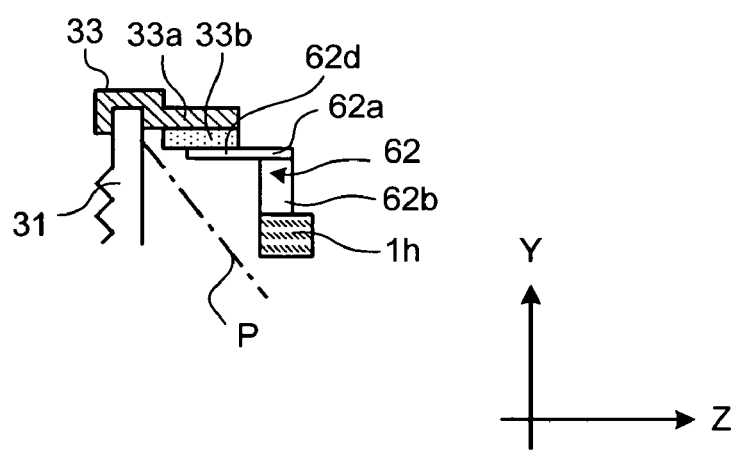
FIG. 13 is a partial cross-section of the Fresnel-lens support mechanism along a line A-A shown in FIG. 12.

Next, an explanation is given of a structure for the Fresnel-lens support mechanism according to the second embodiment using FIGS. 12 and 13. FIG. 12 is a view of a support structure for the Fresnel lens 31 according to the second embodiment, and FIG. 13 is a partial cross-section of the support structure along a line A-A. As shown in FIGS. 12 and 13, the Fresnel lens 31 is fitted into the lens frame 33 and is fixed using, for example, adhesive. The protruding portions 33a protruding toward the incident-light side from the lens frame 33 (optical engine side) are formed at the lens frame 33. The plate-spring fixing members 33b for fixing ends of the plate springs 62 are positioned at the protruding portions 33a at the four corners of the lens frame 33. The other ends of the plate springs 62 are fixed on the casing 1 side. The plate-spring fixing members 1h on the casing 1 side are such that tips of portions fixing the plate springs 62 protrude in the X-direction so as to exist within the plane of the Fresnel lens 31. Positions of the plate springs 62, the plate-spring fixing members 33b, and the plate-spring fixing members 1h are set so as not to block the incident light P. Four plate springs 62 are therefore arranged so as to be fixed in an axially symmetrical manner with respect to screen center axes A and B. The plate springs 62 designed with an angle of an L-shaped connecting portion of substantially 90 degrees are used as the plate springs 62 that bear the weight of the Fresnel lens 31 and the lens frame 33.

An operation of moving the Fresnel lens using the Fresnel-lens support mechanism according to the second embodiment is now explained. The Fresnel lens 31 is supported by L-shaped plate springs 62 having first and second deformation planes 62a and 62b elongated in the YZ-direction during eccentric movement by the Fresnel lens 31 in in-plane directions as a result of the operation of the cam 51. Movement of an X-direction component causes the second deformation plane 62*b* elongated in the Y-direction to flex and movement of a Y-direction component causes the first deformation plane 62*a* elongated in the Z-direction to flex. Movement in an in-plane direction of the Fresnel lens 31 is therefore possible. The plate springs 62 do not have a deformation plane in the Z-direction and rigidity in the Z-direction is therefore high. The Fresnel lens 31 can therefore move in an in-plane direction without becoming tilted with respect to the casing 1. It is therefore possible to stably reduce scintillation without distortion occurring in images during movement and movement is not hindered by external causes such as touching by an observer.

With the Fresnel-lens support mechanism according to the second embodiment, the plate springs 62 are used for positioning and for guiding movement. It is therefore possible to support stable operation without sliding locations and without tilting occurring. The Fresnel lens is supported at the plate springs 62 of a simple shape. It is therefore possible to make a support mechanism at a low price. The plate springs 62 all fit within the projection plane of the lens frame 33 and do not project from the external shape of the Fresnel lens 31. It is therefore possible to make a gap during movement of the Fresnel lens 31 small. It is also possible to make a Fresnel-lens support mechanism without the external shape as viewed from an X-Y plane becoming large. The casing 1 can therefore be made thin and the design can be improved.

In the second embodiment, the four corners are supported by plate springs where first and second deformation planes are elongated in the YZ-direction but can also be supported by plate springs where the first and second deformation planes are elongated in the XZ-direction.

Figure 14:
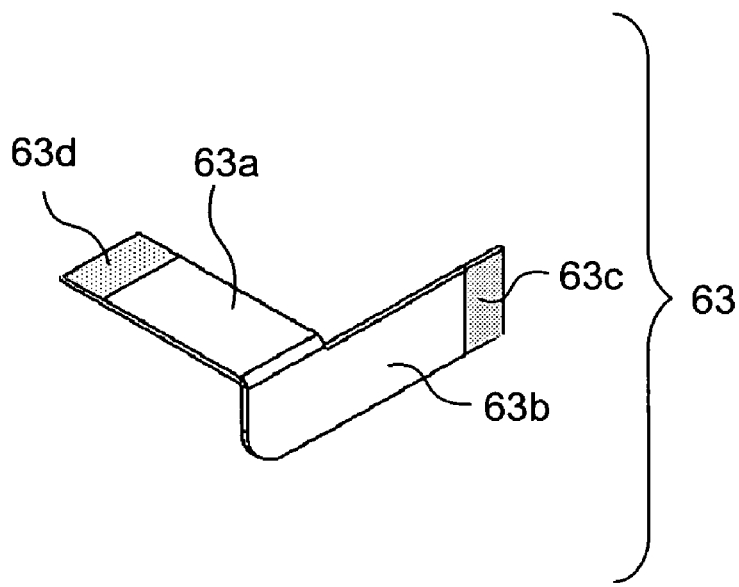
FIG. 14 is a perspective view of a plate spring according to a third embodiment of the present invention.
Figure 14:
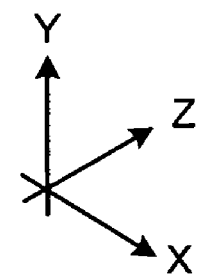

An explanation is now given of a structure for plate springs 63 used in a third embodiment of the present invention using FIG. 14. FIG. 14 is a perspective view of the shape of the plate springs 63. In FIG. 14, the plate spring 63 is formed in an L-shape having first and second deformation planes 63*a* and 63*b* elongated in the XZ-direction, with a fixing member 63*c* on one end fixed to the casing 1 and a fixing member 63*d* on the other end fixed to the lens frame 33. The first deformation plane 63*a* is elongated in the X-direction and is flexible in the Y-direction. The second deformation plane 63*b* is elongated in the Z-direction and is flexible in the X-direction. The support mechanism for the plate springs 63 can be made by making appropriate modifications to the support mechanism shown in FIG. 12 and is therefore not described.

Next, an operation of moving the Fresnel lens using the Fresnel-lens support mechanism according to the third embodiment is explained. The Fresnel lens 31 is supported by L-shaped plate springs 63 having first and second deformation planes 63*a* and 63*b* elongated in the XZ-direction during eccentric movement by the Fresnel lens 31 in an in-plane direction as a result of the operation of the cam 51. Movement of the X-direction component causes the second deformation plane 63*b* elongated in the Z-direction to flex and movement of a Y-direction component causes the first deformation planes 63*a* elongated in the X-direction to flex. Movement in an in-plane direction is then possible. The plate springs 63 do not have a deformation plane in the Z-direction and rigidity in the Z-direction is therefore high. The Fresnel lens 31 can therefore move in an in-plane direction without becoming tilted with respect to the casing 1. It is therefore possible to stably reduce scintillation without distortion occurring in images during movement and movement is not hindered by external causes such as touching by an observer.

At the Fresnel-lens support mechanism according to the third embodiment, the plate springs 63 are used for positioning and for guiding movement. It is therefore possible to support stable operation without sliding locations and without tilting occurring. The Fresnel lens is supported at the plate springs 63 of a simple shape. A support mechanism can therefore be made at a low price.

Figure 15:
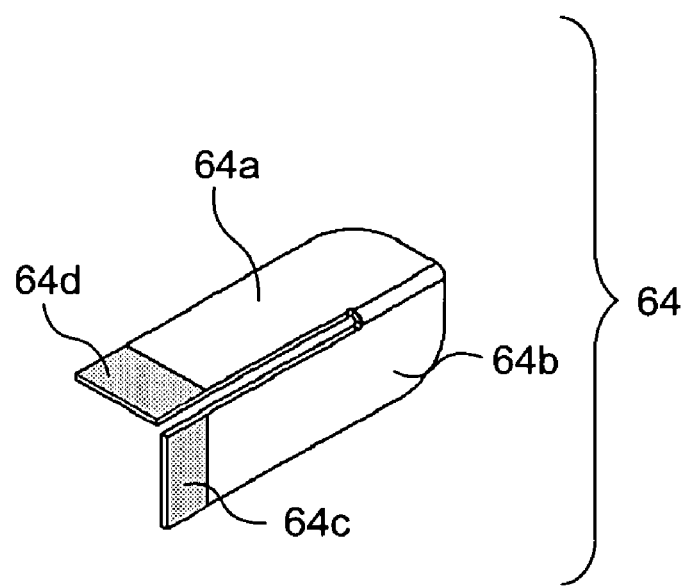
FIG. 15 is a perspective view of a plate spring according to a fourth embodiment of the present invention.
Figure 15:
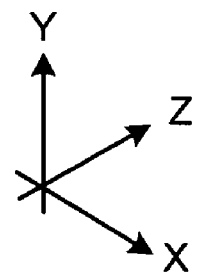

In a fourth embodiment of the present invention, the four corners of the Fresnel lens 31 are supported as a result of the first and second deformation planes being supported by plate springs 64 elongated in the Z-direction. The structure of the plate springs 64 is explained using FIG. 15. FIG. 15 is a perspective view of the shape of a plate spring 64. In FIG. 15, the plate spring 64 is formed in an L-shape having first and second deformation planes 64*a* and 64*b* elongated in the Z direction, with a fixing member 64*c* on one end fixed to the casing 1 and a fixing member 64*d* on the other end fixed to the lens frame 33. The first deformation plane 64*a* is elongated in the Z-direction and is flexible in the Y-direction. The second deformation plane 64*b* is elongated in the Z-direction and is flexible in the X-direction.

Figure 16:
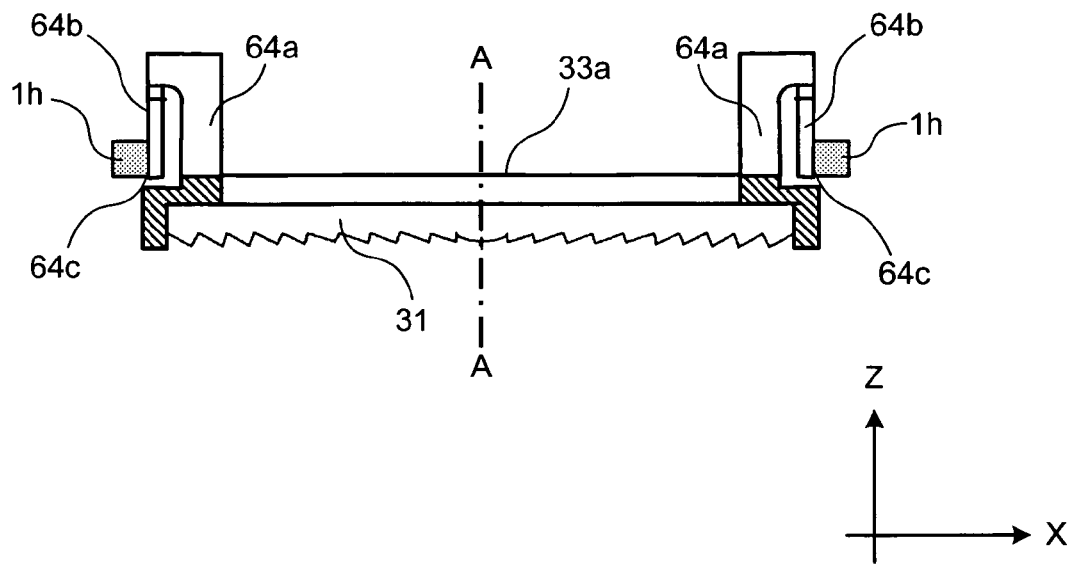
FIG. 16 is a cross-section of a Fresnel-lens support mechanism according to the fourth embodiment along a line B-B.
Figure 17:
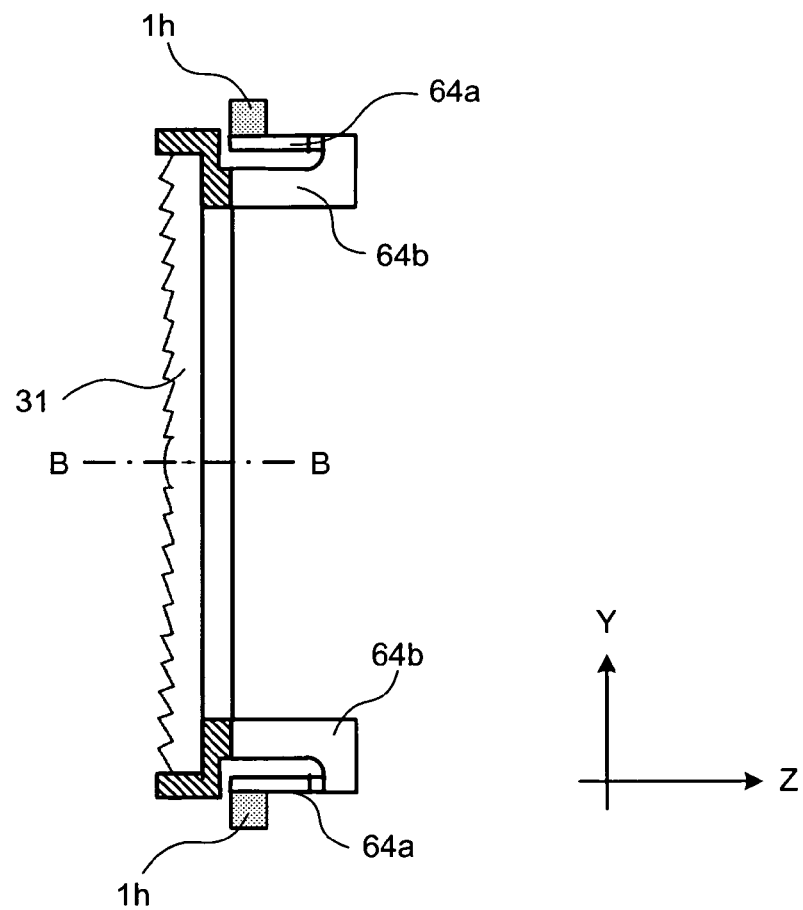
FIG. 17 is a cross-section of the Fresnel-lens support mechanism according to the fourth embodiment along a line A-A.

A description is now given of a structure for a Fresnel-lens support mechanism of the fourth embodiment using FIGS. 16 and 17. FIG. 16 is a cross-sectional view along line B-B depicting a support structure for the Fresnel lens 31 of the fourth embodiment, and FIG. 17 is a cross-sectional view along line A-A. As shown in the drawings, plate springs 64 are arranged in an axially symmetrical manner with respect to center axes A, B of the screen at the four corners of the lens frame 33, with the fixing member 64*d* fixed to the lens frame 33 and the fixing member 64*c* fixed to the plate-spring fixing members 1*h* on the casing 1 side so that the deformation planes 64*a* and 64*b* elongated in the Z-direction extend. The plate springs 64 designed with an angle of an L-shaped connecting portion of substantially 90 degrees are used as the plate springs 64 that bear the weight of the Fresnel lens 31 and the lens frame 33.

Figure 18:
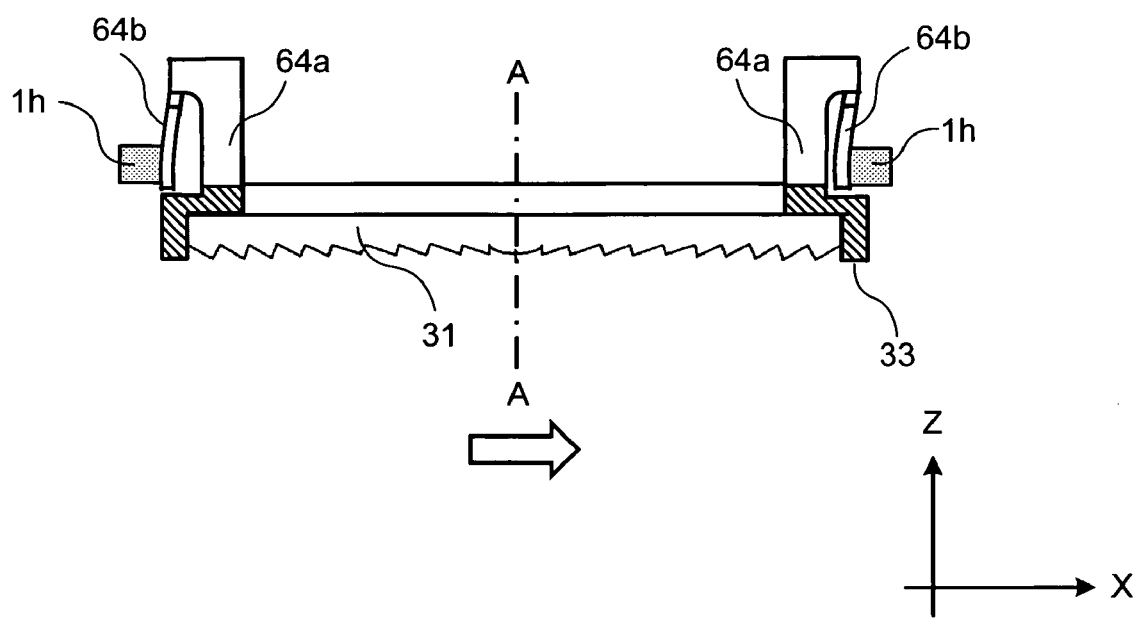
FIG. 18 is a cross-section of the Fresnel-lens support mechanism according to the fourth embodiment along the line B-B when the Fresnel lens is moved in a positive X-direction.
Figure 19:
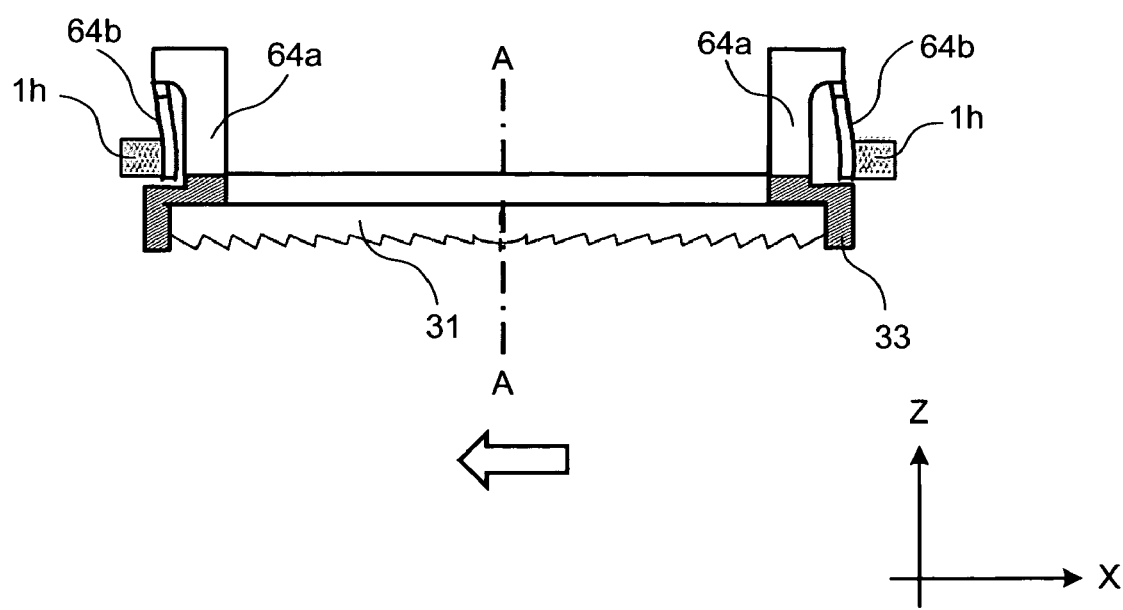
FIG. 19 is a cross-section of the Fresnel-lens support mechanism according to the fourth embodiment along the line B-B when the Fresnel lens is moved in a negative X-direction.
Figure 20:
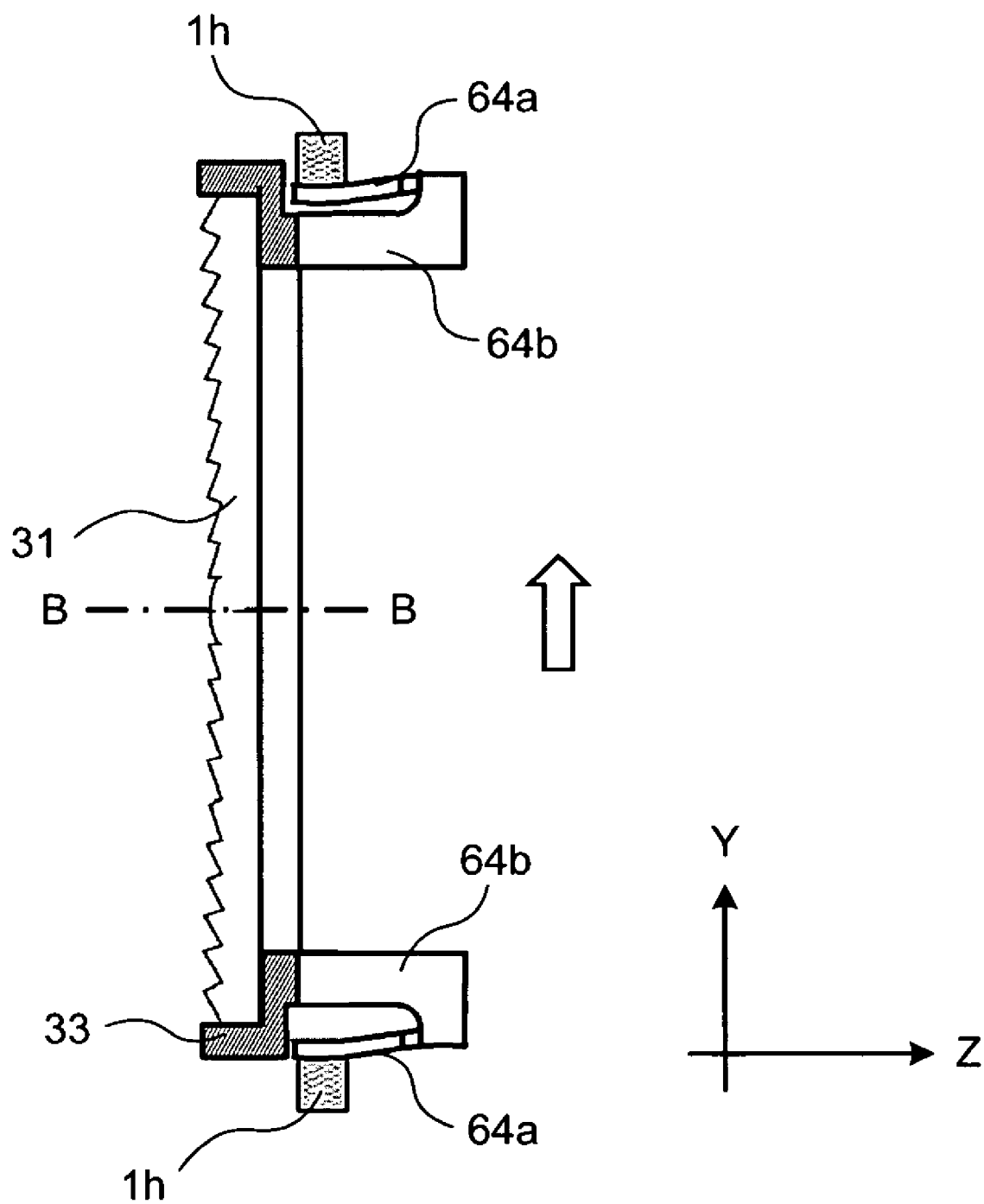
FIG. 20 is a cross-section of the Fresnel-lens support mechanism according to the fourth embodiment along the line A-A when the Fresnel lens is moved in a positive Y-direction.
Figure 21:
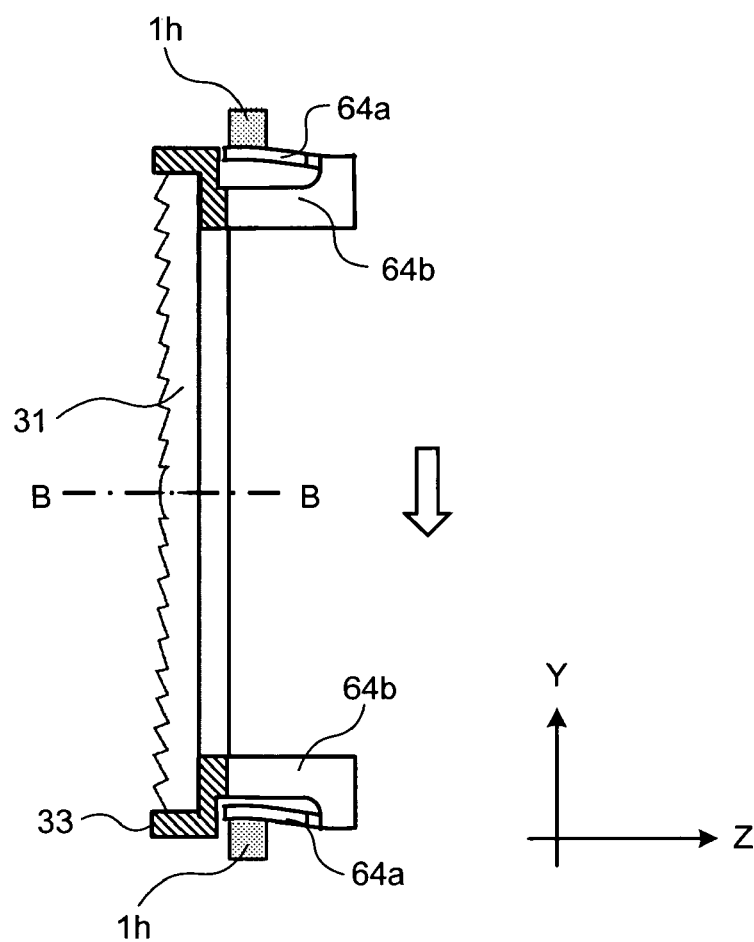
FIG. 21 is a cross-section of the Fresnel-lens support mechanism according to the fourth embodiment along the line A-A for when the Fresnel lens is moved in a negative Y-direction.

Next, an operation of moving the Fresnel lens using the Fresnel-lens support mechanism of the fourth embodiment is explained. The Fresnel lens 31 is supported by L-shaped plate springs 64 having first and second deformation planes 64*a* and 64*b* elongated in the XZ-direction during eccentric movement by the Fresnel lens 31 in an in-plane direction as a result of the operation of the cam 51. Movement of the X-direction component causes the second deformation plane 64*b* to flex, as shown in FIGS. 18 and 19, and movement of a Y-direction component causes the first deformation plane 64*a* to flex, as shown in FIGS. 20 and 21. Movement in an in-plane direction is then possible. The plate springs 64 do not have a deformation plane in the Z-direction and rigidity in the Z-direction is therefore high. The Fresnel lens 31 can therefore move in an in-plane direction without becoming tilted with respect to the casing 1. It is therefore possible to stably reduce scintillation without distortion occurring in images during movement and movement is not hindered by external causes such as touching by an observer.

At the Fresnel-lens support mechanism of the fourth embodiment, the plate springs 64 are used for positioning and for guiding movement. It is therefore possible to support stable operation without sliding locations and without tilting occurring. The Fresnel lens is supported at the plate springs 64 of a simple shape. It is therefore possible to make a support mechanism at a low price. The plate springs 64 are fitted to the lens frame 33 that is slightly smaller than the external dimensions of the Fresnel lens 31. The first deformation planes 63*a* of the plate springs 64 therefore do not project outside of the external shape of the Fresnel lens 31 and a gap during movement of the Fresnel lens 31 can be made small. It is therefore possible to make the casing 1 thin and to improve the design.

In each of the above embodiments, the Fresnel lens 31 is made to move to reduce scintillation but it is also possible to add a diffusion member such as a diffusion sheet that is separate from the Fresnel lens 31 and only move the diffusion member. It is also possible to only move the lenticular screen 32.

Furthermore, in each of the embodiments, the Fresnel-lens support mechanism is arranged at four corners of the Fresnel lens 31 but it is also possible to add a Fresnel-lens support mechanism to a central portion etc. to suppress deformation in the Z-direction of the long side of the Fresnel lens 31.

Figure 22:
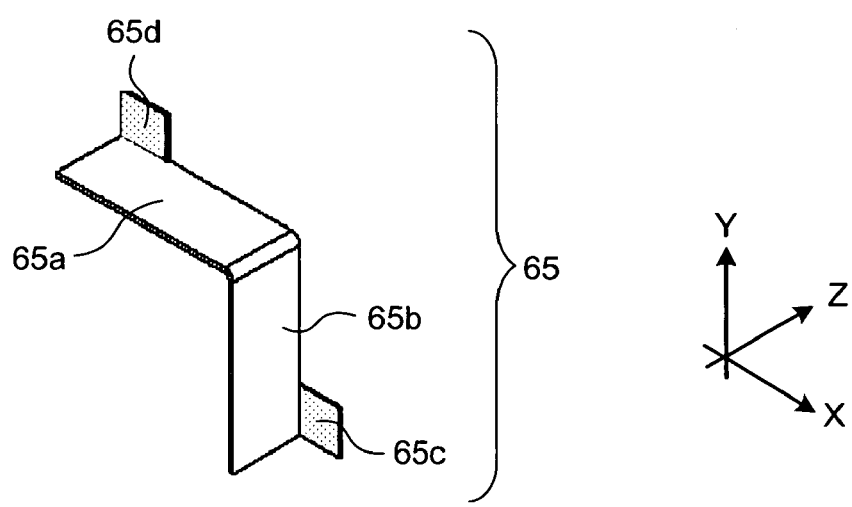
FIG. 22 is a perspective view of a modification example of the plate spring.
Figure 23:
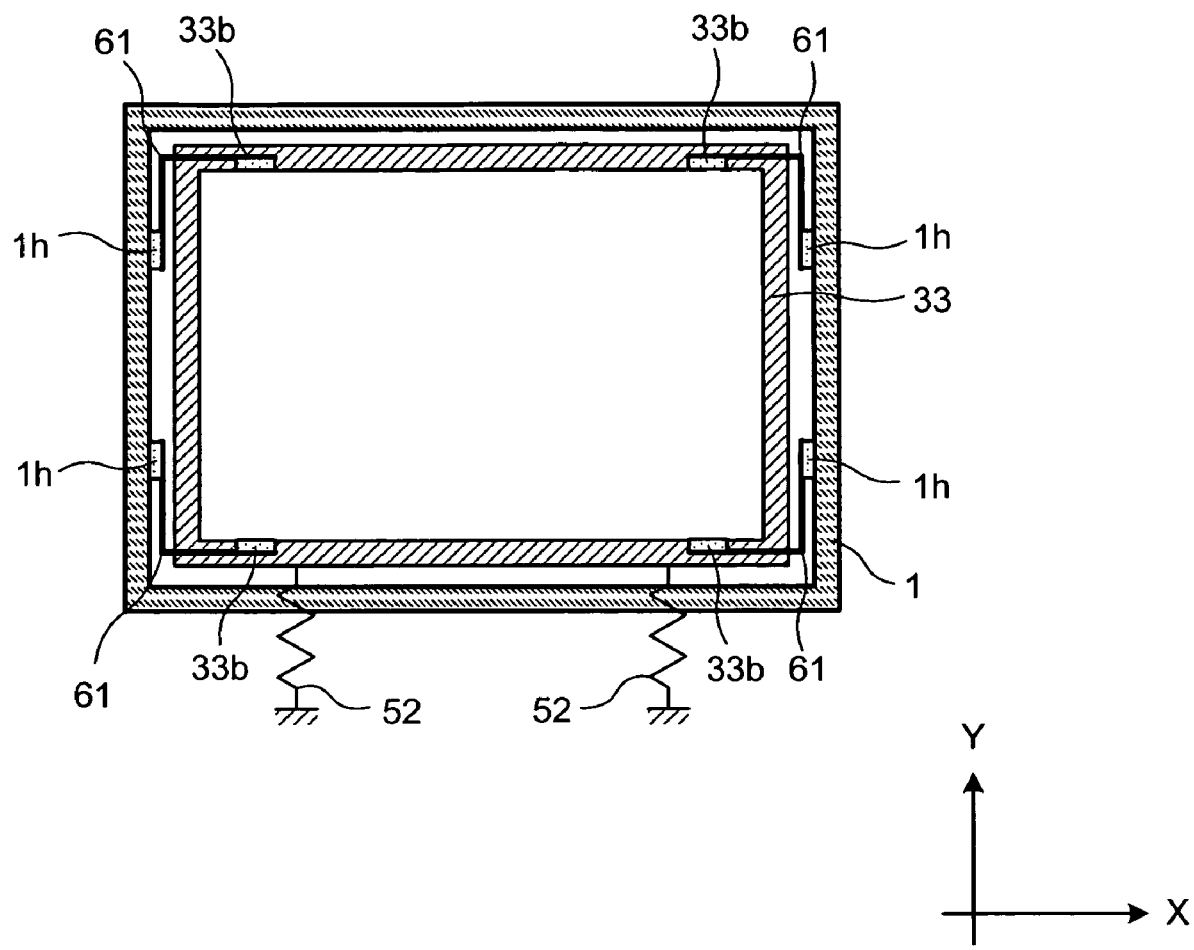
FIG. 23 is a rear view of another Fresnel-lens support mechanism.

Moreover, in each of the above embodiments, the fixing members 61d, 62d, 63d, and 64d coupling with the lens frame 33 at the plate springs 61, 62, 63, and 64 and the fixing members 61c, 62c, 63c, and 64c coupling with the casing 1 are present within each of the first deformation planes 61a, 62a, 63a, and 64a and the second deformation planes 61b, 62b, 63b, and 64b. However, as shown in FIG. 22, it is also possible to adopt a plate spring 65 where bent portions 65c and 65d are added in a different direction, and the bent portions 65c and 65d are taken as surfaces for fitting to the casing 1 and the lens frame 33. At the plate spring 65 shown in FIG. 22, the bent portion 65d is formed at a first deformation plane 65a, and the bent portion 65c is formed at a second deformation plane 65b.

Furthermore, in each of the embodiments, the lens frame 33 supporting the Fresnel lens 31 is designed so as to give an angle of substantially 90 degrees when the first deformation planes 61a, 62a, 63a, and 64a of the plate spring bear a load corresponding to the weight of the Fresnel lens 31 and the lens frame 33. However, it is also possible to add springs 52 to the lower end of the lens frame 33 so as to support the weight of the Fresnel lens 31 and the lens frame 33.

Moreover, in the above embodiments, the Fresnel lens 31 moves so as to trace an eccentric trajectory due to the cam 51. However, other arbitrary structures can also be adopted providing that the Fresnel lens 31 moves continuously within a plane parallel with the screen. In the above embodiments, the present invention is applied to a rear projection-type image projector apparatus but can also be applied to front projection-type image projection apparatus.

The present invention can be applied to projection-type image display apparatus for home or business use and is particularly suited to large screen projection-type image display apparatus where scintillation is easily noticed.

As described above, according to an aspect of the present invention, any one of the Fresnel lens and the diffusion member are continuously moved along a predetermined trajectory within a plane parallel with the screen. The Fresnel lens or the diffusion member and the casing are then coupled using spring members that are flexible in a first direction within a plane parallel with the screen and a second direction substantially perpendicular to the first direction but are not flexible in a direction perpendicular to a plane parallel with the screen. It is therefore possible reduce scintillation and display high-quality images.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection-type image display apparatus comprising:
an optical engine that modulates a laser light according to an image signal and outputs a modulated light;
a screen including
a Fresnel lens that collimates the modulated light from the optical engine and outputs a collimated light, and
a diffusion member that diffuses the collimated light from the Fresnel lens and outputs a diffused light;
a driver that continually moves either one of the Fresnel lens and the diffusion member on a predetermined trajectory within a plane parallel with the screen;
a casing that supports the optical engine, the Fresnel lens, the diffusion member, and the driver; and
a spring member that couples either one of the Fresnel lens and the diffusion member with the casing, wherein
the spring member includes
a first deformation plane flexible in a first direction within the plane,
a first plate spring having the first deformation plane positioned at a first side of a bent portion,
a second deformation plane flexible in a second direction substantially perpendicular to the first direction within the plane, and
a second plate spring having the second deformation plane positioned on a second side of the bent portion, and
spring member is not flexible in a direction perpendicular to the plane.

2. The projection-type image display apparatus according to claim 1, wherein the spring member is arranged at four corners of either one of the Fresnel lens and the diffusion member.

3. The projection-type image display apparatus according to claim 2, wherein the spring member is substantially L-shaped within the plane.

4. The projection-type image display apparatus according to claim 2, wherein
the driver includes an eccentric circular cam, and
either one of the Fresnel lens and the diffusion member are continuously moved based on an eccentric circular trajectory from a movement of the eccentric circular cam.

5. The projection-type image display apparatus according to claim 2, wherein
either one of the Fresnel lens and the diffusion member is supported by a frame, and
at least a part of the spring member is arranged within a projection plane of the frame.

6. The projection-type image display apparatus according to claim 1, wherein the spring member is substantially L-shaped within the plane.

7. The projection-type image display apparatus according to claim 6, wherein
the driver includes an eccentric circular cam, and
either one of the Fresnel lens and the diffusion member are continuously moved based on an eccentric circular trajectory from a movement of the eccentric circular cam.

8. The projection-type image display apparatus according to claim 1, wherein
the driver includes an eccentric circular cam, and
either one of the Fresnel lens and the diffusion member are continuously moved based on an eccentric circular trajectory from a movement of the eccentric circular cam.

9. The projection-type image display apparatus according to claim 1, wherein
either one of the Fresnel lens and the diffusion member is supported by a frame, and at least a part of the spring member is arranged within a projection plane of the frame.

10. The projection-type image display apparatus according to claim 1, wherein at least a part of the spring member is arranged within a projection plane of either one of the Fresnel lens and the diffusion member.

11. A projection-type image display apparatus comprising:
an optical engine that modulates a laser light according to an image signal and outputs a modulated light;
a screen including
a Fresnel lens that collimates the modulated light from the optical engine and outputs a collimated light, and
a diffusion member that diffuses the collimated light from the Fresnel lens and outputs a diffused light;
a driver that continually moves either one of the Fresnel lens and the diffusion member on a predetermined trajectory within a plane parallel with the screen;
a casing that supports the optical engine, the Fresnel lens, the diffusion member, and the driver; and
a spring member that couples either one of the Fresnel lens and the diffusion member with the casing, wherein
the spring member includes
a first deformation plane flexible in a first direction within the plane, and
a second deformation plane flexible in a second direction substantially perpendicular to the first direction within the plane,
the spring member is not flexible in a direction perpendicular to the plane, and
the spring member is arranged at four corners of either one of the Fresnel lens and the diffusion member.

12. The projection-type image display apparatus according to claim 11, wherein the spring member is substantially L-shaped within the plane.

13. The projection-type image display apparatus according to claim 11, wherein
the driver includes an eccentric circular cam, and
either one of the Fresnel lens and the diffusion member are continuously moved based on an eccentric circular trajectory from a movement of the eccentric circular cam.

14. The projection-type image display apparatus according to claim 11, wherein
either one of the Fresnel lens and the diffusion member is supported by a frame, and
at least a part of the spring member is arranged within a projection plane of the frame.

15. The projection-type image display apparatus according to claim 11, wherein at least a part of the spring member is arranged within a projection plane of either one of the Fresnel lens and the diffusion member.

16. A projection-type image display apparatus comprising:
an optical engine that modulates a laser light according to an image signal and outputs a modulated light;
a screen including
a Fresnel lens that collimates the modulated light from the optical engine and outputs a collimated light, and
a diffusion member that diffuses the collimated light from the Fresnel lens and outputs a diffused light;
a driver that continually moves either one of the Fresnel lens and the diffusion member on a predetermined trajectory within a plane parallel with the screen;
a casing that supports the optical engine, the Fresnel lens, the diffusion member, and the driver; and
a spring member that couples either one of the Fresnel lens and the diffusion member with the casing, wherein
the spring member includes
a first deformation plane flexible in a first direction within the plane, and
a second deformation plane flexible in a second direction substantially perpendicular to the first direction within the plane,
the spring member is not flexible in a direction perpendicular to the plane, and
the spring member is substantially L-shaped within the plane.

17. The projection-type image display apparatus according to claim 16, wherein
the driver includes an eccentric circular cam, and
either one of the Fresnel lens and the diffusion member are continuously moved based on an eccentric circular trajectory from a movement of the eccentric circular cam.

18. The projection-type image display apparatus according to claim 16, wherein
either one of the Fresnel lens and the diffusion member is supported by a frame, and
at least a part of the spring member is arranged within a projection plane of the frame.

19. The projection-type image display apparatus according to claim 16, wherein at least a part of the spring member is arranged within a projection plane of either one of the Fresnel lens and the diffusion member.

* * * * *